United States Patent [19]

Duong et al.

[11] Patent Number: 4,485,272

[45] Date of Patent: Nov. 27, 1984

[54] ACOUSTIC FEEDBACK CANCELLING ELECTRO-ACOUSTIC TRANSDUCER NETWORK

[75] Inventors: Tuan K. Duong, Elancourt; Emmanuel Lefort, Montigny le Bretonneux; Maurice G. Bellanger, Paris, all of France

[73] Assignee: Telecommunications Radioelectriques et Telephoniques T.R.T., Paris, France

[21] Appl. No.: 354,478

[22] Filed: Mar. 3, 1982

[30] Foreign Application Priority Data

Apr. 1, 1981 [FR] France ................... 81 06530

[51] Int. Cl.³ .................... H04M 1/20; H04R 3/02
[52] U.S. Cl. .................... 179/81 B; 381/93
[58] Field of Search .......... 179/1 CN, 1 DM, 1 FS, 179/1 HF, 81 B, 100 L, 18 BC; 381/92, 83, 93, 66

[56] References Cited

U.S. PATENT DOCUMENTS

| | | | |
|---|---|---|---|
| 2,177,769 | 10/1939 | Erickson | 179/1 FS |
| 3,922,488 | 11/1975 | Gabr | 179/1 FS X |
| 3,992,586 | 11/1976 | Saffe | |
| 4,237,339 | 12/1980 | Bunting et al. | 179/1 FS X |
| 4,311,874 | 1/1982 | Wallace, Jr. | 381/92 X |

FOREIGN PATENT DOCUMENTS 1002395 5/1960 Fed. Rep. of Germany .
1091771 4/1961 Fed. Rep. of Germany .

OTHER PUBLICATIONS

*Telsis,* Feb. 1977, pp. 16-21, "Audio Teleconferencing-The Telephone and the Environment", by Radamis Botros.

Rec. Electr.≠Commun. Eng. Conversazionne, Tohoku Univ. (Japan) vol. 48, No. 2, May 1979, pp. 55-60; "An Application of a Linear Array of Microphones to a Sound Reinforcement System", by Kim et al.

*Primary Examiner*—Keith E. George
*Attorney, Agent, or Firm*—Bernard Franzblau

[57] ABSTRACT

An electroacoustic transducer apparatus which prevents oscillations as a result of acoustic coupling between an acoustic-wave transmitter and a receiver. The transmitter and receiver each comprise an electroacoustic transducer network. The transducers in each network are arranged so that the phase and amplitude of the signals applied to the transmitter transducers and the signals supplied to an adder circuit by the receiver network transducers (25) to (30) of the receiver network are such that in the oscillation frequency band the radiation pattern of the transmitter network and the directivity pattern of the receiver network are zero in at least one direction. The two networks are arranged relative to each other so that the directions of minimum radiation and directivity correspond to the directions of maximum coupling between the transducers of the two networks.

27 Claims, 18 Drawing Figures

ACOUSTIC FEEDBACK CANCELLING ELECTRO-ACOUSTIC TRANSDUCER NETWORK

BACKGROUND OF THE INVENTION

The invention relates to an arrangement of an electrically coupled acoustic-wave transmitter and receiver, which arrangement serves to prevent the occurrence of oscillations as a result of acoustic feedback.

Self-sustained oscillation may for example occur in so-called "loudspeaking" telephone sets. In these sets, which are equipped with a loudspeaker and a microphone arranged comparatively close to each other, undesired oscillations may be produced in the loop comprising the acoustic path between the loudspeaker and the microphone and the electrical path if no precautions are taken. These oscillations are caused by an incorrect decoupling between the channel connected to the loudspeaker and the channel connected to the microphone. In order to preclude said oscillations, which give rise to a howling sound which renders the telephone set almost unusable, the known methods influence the electrical part of the loop. Said known methods are of two general types mentioned in the article "Adaptive Filters to improve Loudspeaker telephone" by South et al in Electronics Letters, Oct. 11, 1979, Vol. 15, no. 21, pages 673–674. According to a first known method, in order to reduce the electrical gain in the loop and thereby prevent the occurrence of oscillations, an attenuator is included in the loudspeaker channel or in the microphone channel depending on whether a speech signal appears in the microphone channel. Apart from a certain degree of complexity, said method renders the conversation unnatural, specifically because it is difficult to interrupt a speaker who is talking into the microphone. According to a second known method, which is based on echo-cancellation techniques, use is made of two adaptive filters which are controlled so as to form replicas of the electrical and acoustic paths of the loop in which the oscillations arise, the signals supplied by said filters being subtracted from the signals appearing in the two channels, Said second method has the disadvantage of a high complexity.

It is an object of the present invention to prevent the occurrence of oscillations in an electro-acoustic loop which comprises an acoustic transmitter and an acoustic receiver while mitigating the drawbacks of the known methods.

SUMMARY OF THE INVENTION

The basic idea of the invention is to provide an acoustic decoupling without having to move the acoustic transmitter and receiver away from each other, which in the case of a "loudspeaking" telephone set would not be acceptable, by the use of two loudspeaker and microphone networks for the transmitter and receiver which respectively have such radiation and directivity patterns that the desired decoupling can be obtained through a suitable arrangement of these two networks.

According to the invention the acoustic-wave transmitter and receiver comprise two electro-acoustic transducer networks. The arrangement of the transducers in each network, the phase and amplitude of the signals applied to the transducers of the transmitter network and the signals supplied to an adder circuit by transducers of the receiver network are such that in the frequency band in which oscillations are likely to occur the radiation pattern of the transmitter network and the directivity pattern of the receiver network each have a minimum value of substantially zero in at least one direction, the arrangement of the two networks relative to each other is such that the directions of minimum radiation and directivity substantially correspond to the directions of maximum coupling between the transducers of the two networks.

Preferably, the arrangement of the two transducer networks relative to each other is such that the centre of radiation of the transmitter network substantially coincides with the centre of the directivity pattern of the receiver network.

In various preferred embodiments of the arrangement in accordance with the invention the transducers are arranged in line in each network.

Thus, the first one of the two networks may comprise an even number of transducers of one type (loudspeakers or microphones) arranged symmetrically relative to a point 0 on a line x'x. The transducers situated at the same side of point 0 are spaced from each other by a distance d, and the signals applied to the transducers (or supplied by the transducers) are weighted by means of weighting circuits in such a way that the radiation amplitude (or directional sensitivity) of the transducer network is zero in the directions of lines which pass through point 0 and which are perpendicular to the line x'x.

Suitably, a second network is associated with said first network and comprises an even number of transducers of the other type, which transducers are disposed symmetrically relative to said point 0 on a line y'y perpendicular to said line x'x, the transducers situated at the same side of point 0 are spaced from each other by the distance d, and a signals applied to the transducers (or supplied by the transducers) are weighted by means of weighting circuits in such a way that the radiation amplitude (or directional sensitivity) of the transducer network disposed on the line y'y is zero in the direction of lines which pass through the point 0 and which are perpendicular to the line y'y.

In practice, for determining the transducer networks used for the invention and having given radiation or directivity (directional sensitivity) patterns, it may be desirable, as will be explained hereinafter, to make use of an analogy with digital filters which serve to produce a given transfer function.

Finally, it is to be noted that the arrangement of the acoustic transducers in accordance with the invention, which eliminates or reduces acoustic coupling between the acoustic transmitter and the acoustic receiver, is not incompatible with known devices for reducing the electrical coupling between said transmitter and said receiver and may provide a substantial simplification of said devices.

A "loudspeaking" telephone set may be realized in practice using a limited number (some units) of small, simple, robust and cheap transducers, such as electric microphones and loudspeakers. The following description with reference to the accompanying drawings, given by way of example, will enable the invention to be more fully understood.

BRIEF DESCRIPTION OF THE DRAWINGS

FIG. 4a represents a radiation or a directivity pattern corresponding to the transfer function of a high-pass filter shown in 4b; 4c represents the impulse response of said filter and the coefficients of the corresponding digital filter.

FIG. 9a represents a radiation or a directivity pattern corresponding to the transfer function of a low-pass filter as shown in 9b; 9c represents the impulse response of said filter and the coefficients of the corresponding digital filter.

BRIEF DESCRIPTION OF THE PREFERRED EMBODIMENTS

Figure 1:
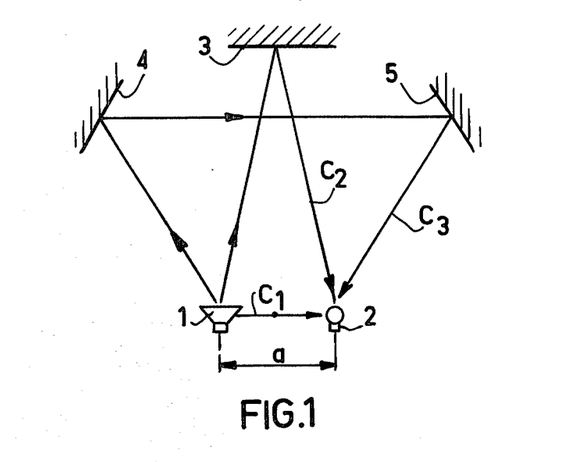
FIG. 1 shows different paths between a loudspeaker and a microphone corresponding to various types of acoustic coupling.

FIG. 1 serves to illustrate the various types of acoustic coupling existing between a loudspeaker 1 and a microphone 2 disposed side by side at a small distance a, as for example in a "loudspeaking" telephone set. In the case of direct coupling the acoustic signal emitted by the loudspeaker 1 reaches the microphone 2 following the direct path represented by the line $C_1$. In the case of coupling via a single reflection the acoustic signal emitted by the loudspeaker reaches the microphone after one reflection from a wall 3 situated substantially opposite said transducers by following the path represented by the line $C_2$. Finally, multiple-reflection coupling is possible, for example coupling via two reflections from the two walls 4 and 5, the acoustic signal following the path represented by the line $C_3$.

Figure 2:
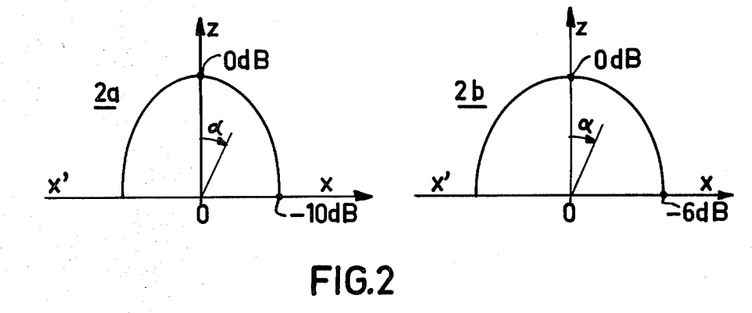
FIG. 2 is an example of a radiation pattern of a loudspeaker and a directivity pattern of a microphone.

Said types of coupling can be compared in the radiation and directivity diagram given by way of example in 2a and 2b in FIG. 2 for a loudspeaker and a microphone respectively. These these two diagrams are plotted for the same frequency, for example 1000 Hz, in the part of a plane defined by the axis x'OX and the axis Oz. As is shown by the diagram 2a, the sound intensity radiated by the loudspeaker under consideration is maximum for the direction Oz; such that $\alpha=0°$. For the opposite directions Ox and Ox' such that $\alpha=\pm 90°$, the radiated sound intensity has a level of $-10$ dB relative to the 0 dB level assumed for the direction Oz. As is indicated by the diagram 2b for the relevant microphone, the corresponding levels are $-6$dB for the directions Ox, Ox' relative to the maximum level of 0 dB for the direction Oz. Taking the attenuation of the acoustic signal between the loudspeaker and the microphone, which are disposed opposite each other at a distance a, as reference, it follows that for the direct coupling $C_1$ an attenuation $Af_1 = (10+6)$ dB $= 16$ dB occurs. For the coupling of type $C_2$, allowance being made for the fact that the attenuation is proportional to the distance and assuming that the path $C_2$ has a length $10a$ and a reflection gives rise to an attenuation of 3 dB, the total attenuation is $Af_2 = (20+3)$ dB $= 23$dB. For the coupling of type $C_3$ with two reflections, assuming that the path $C_3$ has a length 20 a and that the directional attenuation is 5 dB, a total attenuation $Af_3 = (26+6++5)$ dB $= 37$ dB is obtained. It is also found that in a conventional arrangement of a loudspeaker and a microphone disposed side by side the most significant couplings are those of type $C_1$ and $C_2$. These two types of coupling should first of all be eliminated in order to prevent the occurrence of self-sustained oscillations.

Figure 3:
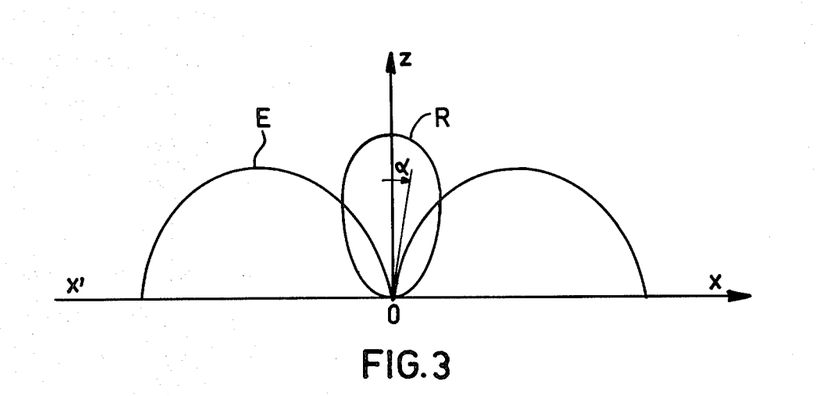
FIG. 3 represents the variation of the radiation and directivity patterns obtained by the acoustic transducer networks in accordance with the invention in order to avoid the acoustic coupling which may give rise to self-sustained oscillations.

In order to eliminate or reduce the acoustic coupling, in accordance with the invention, two acoustic transducer networks are employed as an electro acoustic wave transmitter and receiver. The arrangement of the transducers in each network, the phase and amplitude of the electric signals applied to said transducers or produced by said transducers are determined in such a way that in the frequency band in which oscillations are likely to occur the radiation pattern of the acoustic transmitter network and the directivity pattern of the acoustic receiver network each have a minimum value of substantially zero in at least one direction. The arrangement of the one network relative to the other network is such that the directions of minimum radiation and directivity substantially correspond to the directions of maximum coupling between the transducers of the two networks. FIG. 3 represents examples of the radiation and directivity patterns in the plane (Oz, x'Ox) which are suitable for suppressing the previously defined direct coupling and the coupling owing to surface reflection in said plane. In FIG. 3 the radiation pattern of the transmitter network is represented by the curve E and the directivity pattern of the receiver network is represented by the curve R. In accordance with said diagrams the radiation of the transmitter network is zero in the direction Oz ($\alpha=0$) for which the directivity of the receiver network is maximum, whereas said directivity is zero in the direction Ox, Ox'($\alpha=\pm 90°$) for which the radiation of the transmitter network is also maximum. Moreover, it is advantageous, as is the case for the diagrams of FIG. 3, that the radiation of the transmitter network be negligible in directions inside a sector around the direction Oy and the directivity of the receiver network be negligible in directions of the sectors of the plane adjacent the directions Ox and Ox'. In the example of FIG. 3 the arrangement of the two networks relative to each other is such that the centre of radiation of the transmitter coincides with the centre of directivity of the receiver in point 0. It is obvious that with the networks producing the diagrams in the relevant part of the plane the direct acoustic coupling is eliminated completely because the acoustic receiver has zero directivity in the directions $\alpha = \pm 90°$ of said direct coupling. The coupling via a single surface-reflection is also eliminated completely because the acoustic transmitter has zero radiation in the direction $\alpha = 0$ of said coupling by surface reflection. Moreover, multiple reflection couplings are attenuated considerably when they correspond to sectors with a negligible radiation or directivity.

The same decoupling properties can be obtained by inverting the two diagrams of FIG. 3, which means that it is also possible to employ a transmitter network having a radiation pattern as represented by the diagram R and a receiver network having a directivity as represented by the diagram E. Furthermore, the centres of radiation and directivity of the two transmitter and receiver networks need not necessarily coincide, as in the case of FIG. 3. It may, for example, be advantageous in certain cases if the centre of directivity of the receiver as represented by the diagram R is disposed on the axis OZ at a specific distance from the point 0. Finally, it is to be noted that the shape and the orientation of the two diagrams shown in FIG. 3 are suitable for eliminating direct acoustic coupling and coupling via surface reflection, which are generally the most annoying types of coupling. However, in specific arrangements, or if the transmitter and receiver networks are constructed of transducers having special radiation and directivity properties, it may be desirable to eliminate other types of acoustic coupling occurring in directions other than the perpendicular directions Ox and Oz. In that case, the transmitter and receiver networks should be adapted and or arranged relative to each other so that radiation and directivity patterns are obtained which are zero in the directions in which the most annoying acoustic coupling occurs.

For the sake of clarity reference will be made hereinafter to the most frequent case in which the strongest coupling occurs in two perpendicular directions and in which, in order to eliminate said coupling, the radiation amplitude of the transmitter network should be zero in one of said directions and the directional sensitivity of the receiver network should be zero in the other direction. Transducer networks will now be described which have radiation and directivity patterns which enable said requirements to be met. An important effect to be allowed for in the design of said networks is the deformation of said radiation and directivity patterns as a function of the frequency. For example, in the case of a "loudspeaking" telephone set the frequency band to be considered is the band from 300 to 3400 Hz for telephone signals.

In the design of said acoustic transducer networks use can be made of the well-known principles on which the design of radio antenna networks is based. Thus, as is known, it is possible to obtain a specific radiation pattern with an antenna network which is suitably arranged and energized by signals of suitable amplitude and phase. Similarly, it is possible to obtain a specific radiation pattern with a network of loudspeakers which are suitably arranged and energized by signals of suitable amplitude and phase. Moreover, it is possible to obtain a specific directivity pattern with a network of microphones which are suitably arranged and whose output signals are added to each other with suitable phase and amplitude. The desired acoustic decoupling can then be obtained by suitably arranging the loudspeaker network and the microphone network relative to each other.

For the practical definition of the parameters of a loudspeaker or microphone network having a given radiation pattern the following considerations may be useful. In general, the radiation theory states that the radiation pattern of a planar source is given by the two dimensional Fourier transform of the distribution of the radiated powers in each point of said source: for this subject reference is made to for example the publication by A. Angot, Compléments de Mathématiques, 5th edition, 1965, chapter 2, pages 92–93. Conversely, said power distribution is given by the inverse Fourier transform of the radiation pattern. Considering the symmetries, a limitation is possible to the case of a linear radiation source and a planar radiation pattern, to which in a similar fashion the conventional one-dimensional Fourier transform may be applied. Finally, the loudspeakers and microphones to be used in the acoustic-transducer networks are of small dimensions and may therefore, to a first approximation, be compared with point-shaped radiation sources and receivers. In order to determine the networks of said point-shaped transducers it is advantageous to utilize the digital filter theory. The sampled time interval corresponds to the line on which the acoustic transducers are disposed. The value of the samples which are regularly spaced in the pulse response of a filter corresponds to the value of the signals energizing the loudspeakers which are regularly spaced from each other on a line or the value of the signals produced by microphones which are regularly spaced on a line and which are to be added to each other. Finally, the frequency response of a filter corresponds to a radiation pattern of the loudspeaker network or a directivity pattern of the microphone network, the frequency f used in defining the frequency response of the filter being related to the angle $\alpha$ used in defining the diagrams of the transducer networks, and to the wavelength $\lambda$ of the acoustic waves by the relationship:

$$f = (\sin \alpha)/(\lambda)$$

Figure 4:
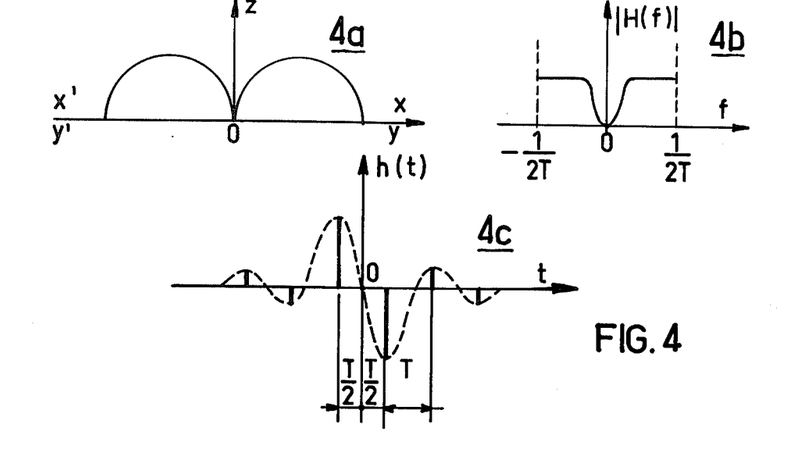

FIG. 4 illustrates said analogy between the radiation patterns and filters. FIG. 4a represents a radiation (or directivity) pattern to be obtained in the plane (Oz, x'Ox). FIG. 4b represents the transfer function $|H(f)|$ of the high-pass filter corresponding to the pattern of FIG. 4a, the correspondence between the frequency f and the angle $\alpha$ being given by the said relationship $f = (\sin \alpha)/(\lambda)$. Said transfer function is represented for the frequency band $[-1/2T, 1/2T]$, $1/T$ being the sampling frequency of the filter. For the digital filter the transfer function is recurrent around the frequency $1/T$ and its harmonics. This periodicity of the filter response in the frequency domain corresponds to a periodicity in the radiation pattern which in an identical manner is recurrent around values of the angle $\alpha$ which are multiples of 360°.

For the theory and practice of digital filters reference is made to the publication "Le traitement numérique du signal" by M. Bellanger, Edition Masson 1981. In order to obtain a desired transfer function $|H(f)|$ digital filters may be used having a finite impulse response, which filters are discussed in chapter V of said publication. The coefficients of such a filter are defined in FIG. 4c. The dashed curve in said Figure is the continuous impulse response of said high-pass filter having the transfer function $|H(f)|$ of FIG. 4b: said impulse response, which is of the anti-symmetric type for a high-pass filter, is limited to a time interval containing an even number of 2P samples which are spaced by a sampling interval T. The 2P samples of said impulse response (2P=6 in the example shown) are symetrically distributed around the point of time origin 0 and represent the magnitude and sign of the coefficients to be used in the digital filter in order to obtain the transfer function of FIG. 4b. It is to be noted that the coefficients which are situated symmetrically relative to point 0 have the same amplitude but opposite signs. Similarly, in order to obtain the radiation (or directivity) pattern of FIG. 4a, use can be made of a network of 2P acoustic transducers distributed on a line in the same way as the 2P filter coefficients of the diagram 4c. The signals applied to (or supplied by) said transducers are weighted with coefficients which correspond to the filter coefficients of FIG. 4c. Such a transducer network whose radiation pattern corresponds to a high-pass filter will be referred to hereinafter as a transducer network of the first type.

Figure 5:
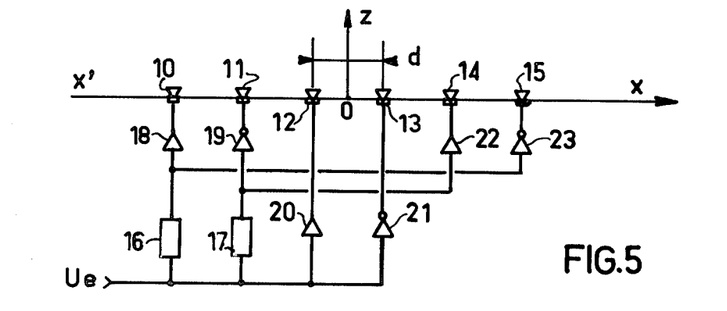
FIG. 5 shows a loudspeaker network by means of which the radiation patterns shown in FIG. 4a can be obtained.

In accordance with this concept, FIG. 5 represents a network of 2P loudspeakers by means of which the radiation pattern of FIG. 4a can be obtained, using loudspeakers which are each assumed to radiate identically in directions such that $-90°\leq\alpha\leq90°$. Said network is formed by 2P loudspeakers spaced from each other by a distance d and disposed symmetrically about the centre of radiation 0 on the line x'x. Each loudspeaker is for example arranged so as to exhibit a maximum radiation in the direction Oz. In the example shown the network comprises six loudspeakers 10 to 15. The signals applied to said loudspeakers are derived from the electric signal Ue, to be radiated as an acoustic wave, in such a way that their amplitude and phase correspond to the magnitude and sign of the filter coefficients of diagram 4c. The loudspeakers which are disposed symmetrically relative to the centre of radiation 0 should be energized with signals of the same amplitude and opposite phase. This drive of the loudspeakers can be obtained, as is shown by way of example in FIG. 5, by means of two attenuator circuits 16, 17 which serve to adjust the amplitudes of the signals and by means of the follower circuits 18, 20, 22 and the phase inverter circuits 19, 21, 23.

Figure 6:
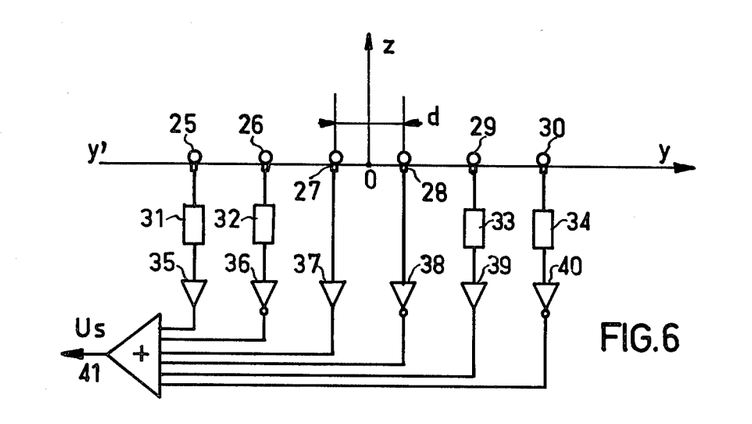
FIG. 6 shows a microphone network by means of which the directivity pattern shown in FIG. 4a can be obtained.

Using the same concept it is possible to obtain a network of microphones with a directivity pattern in accordance with the diagram of FIG. 4a. FIG. 6 shows a network of 2P microphones which are each assumed to have the same directivity in directions such that $-90°\leq\alpha\leq90°$. In the example shown said network comprises six microphones which are distributed in exactly the same way as the six loudspeakers in FIG. 5. The microphones 25 to 30 are disposed symmetrically relative to the centre of directivity 0 on a line y'y. Before being added to each other, the signals supplied by said microphones should be weighted with weighting coefficients corresponding in magnitude and sign to the filter coefficients of FIG. 4c. The signals produced by the microphones which are disposed symmetrically relative to the centre of directivity 0 should be weighted with coefficients of the same amplitude and opposite sign. As is shown by way of example in FIG. 6, the microphone signals can thus be processed, by means of attenuator circuits 31 to 34, which serve for adjusting the signal amplitudes, by means of follower circuits 35, 37 and 39, phase inverters 36, 38 and 40, and finally by means of the adder circuit 41, which supplies the output signal $U_s$ of the microphone network.

Figure 7:
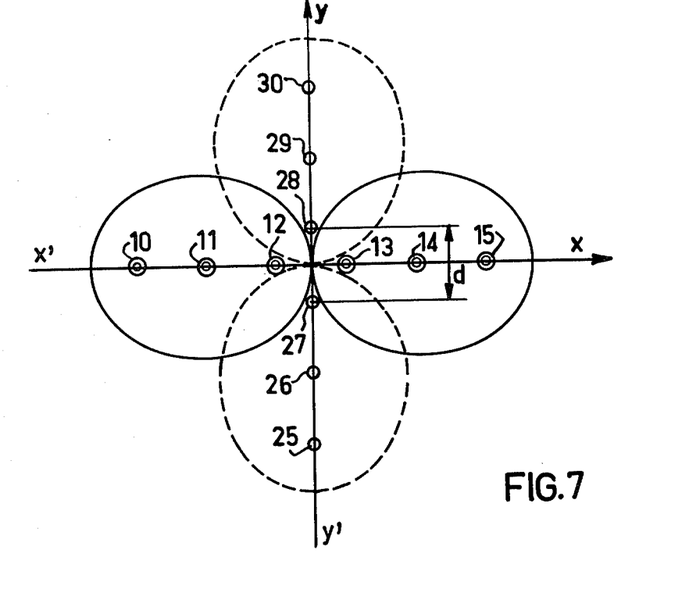
FIGS. 7 and 8 show two variants of an arrangement of the loudspeaker network of FIG. 5 and the microphone network of FIG. 6.

An arrangement will now be described using the networks of FIGS. 5 and 6, each comprising an even number of transducers, by means of which it is possible to eliminate direct coupling and coupling via surface reflection. Said arrangement is shown in FIG. 7 said which is a front view of the six loudspeakers 10 to 15 disposed on the line x'x and the six microphones 25 to 30 disposed on the line y'y perpendicular to the line x'x. The centres of radiation and directivity of said networks coincide with point 0. Each loudspeaker and each microphone has a maximum radiation and a maximum directivity in the direction Oz perpendicular to the plane defined by the two lines x'x and y'y. However, in accordance with the diagram of FIG. 4a, the radiation of the loudspeaker network and the directivity of the microphone network are zero in said direction Oz. This results in the substantial elimination of coupling between these two transducer networks via surface reflection. In each plane containing the line x'x or the line y'y there is also a direction which passes through point 0 along which the radiation is zero or the directivity is zero, which also contributes to a reduction of coupling between these two networks. Finally, in the plane defined by the lines x'x and y'y the radiation pattern of the loudspeaker network is as represented by the solid curve in FIG. 7- this pattern which is symmetrical relative to the line x'x, has the shape of the pattern of FIG. 4a on each side of said line. The directivity pattern of the microphone network is as represented by the dashed curve. This pattern is symmetrical relative to the line y'y and has the same shape as the radiation pattern. These two patterns clearly show that in the plane (x'x,y'y) the radiation of the loudspeaker network is zero in two opposite directions Oy, Oy', in which the directivity of the microphone network is a maximum and, conversely, the directivity of the microphone network is zero in the two opposite directions Ox, Ox' in which the radiation of the loudspeaker networks is maximum. This results in the practical elimination of the direct coupling between the two transducer networks.

The digital filter theory suggests a slightly different variant in order to obtain the transducer networks producing a pattern of the type shown in FIG. 4a. As is known, a high-pass filter having the transfer function $|H(f)|$ of FIG. 4b and the impulse response h(t) of FIG. 4c can be realized by means of a digital filter having a central coefficient of zero and an even number of coefficients which are regularly distributed around said central coefficient. From this it is possible to derive the arrangement of the two loudspeaker and microphone networks shown in FIG. 8. This arrangement differs from that of FIG. 7 in that the two transducers nearest the centre 0 in each network are situated at a distance of 2d instead of d from each other. The circuit diagrams of these transducers remain the same as in FIGS. 5 and 6. In order to obtain exactly the same radiation and directivity patterns in the two variants of FIGS. 7 and 8, the amplitudes of the signals should be adjusted to different values.

Figure 9:
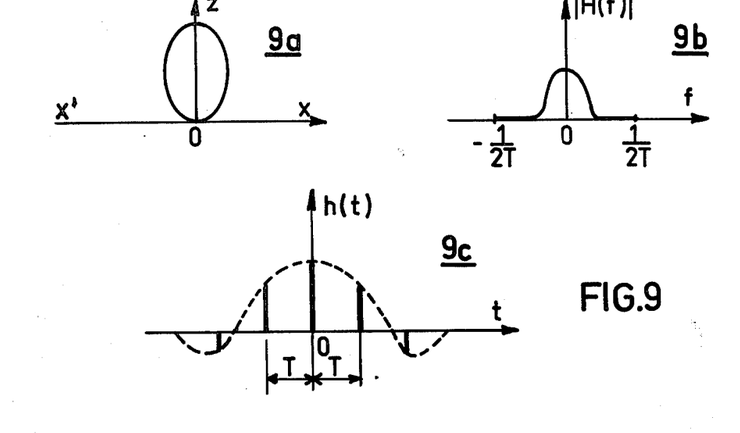

A second type of in-line transducer network can be formed, which will be described with reference to FIG. 9, by utilizing the analogy with digital filters. FIG. 9a shows the radiation pattern of said second type of network. This pattern corresponds to the transfer function $|H(f)|$ shown in FIG. 9b, which is that of a low-pass filter. Said low-pass filter has the pulse response h(t) represented by the dashed curve in FIG. 9c. Said pulse response, which is of the symmetrical type for a low-pass filter, is limited to a time interval in which an odd number of (2P+1) samples occur and which are spaced from each other by the sampling period T. Said 2P+1 samples (2P+1=5 in the present example) are distributed symmetrically around the point of time origin 0 and their magnitude and sign represent the coefficients to be used in the digital filter in order to obtain the transfer function of FIG. 9b. It is to be noted that the coefficients whose position is symmetrical relative to point 0 have the same amplitude and the same phase. In a corresponding manner, in order to obtain the radiation (or directivity) pattern of FIG. 9a, use can be made of a network of 2P+1 acoustic transducers arranged along a line, the signals applied to (or supplied by) said transducers being weighted with coefficients which correspond to the filter coefficients of FIG. 9c.

Figure 10:
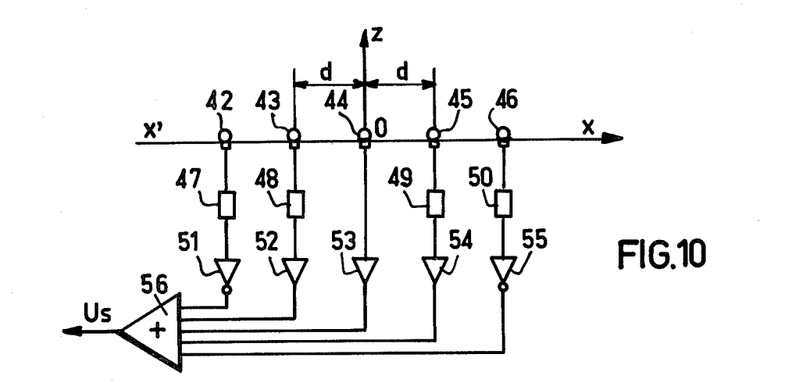
FIG. 10 shows a microphone network by means of which the directivity pattern shown in FIG. 9a can be obtained.

Using said concept it is for example possible to design a network of 2P+1=5 microphones, as shown in FIG. 10. Said network, which serves to obtain the directivity pattern of FIG. 9a comprises the five microphones 42 to 46 disposed symmetrically relative to the directivity centre 0 on the line x'x. Said microphones are spaced from each other by the distance d and, for example, have their maximum directivity in the direction Oz. Before being added to each other, the signals supplied by said microphones are weighted with weighting coefficients corresponding to the filter coefficients of FIG. 9c. The operations to which the microphone signals should be subjected can be effected, as is shown by way of example in FIG. 10, by means of attenuator circuits 47 to 50, by means of inverter circuits 51, 55, by means of followers 52, 53, 54, and finally by means of the adder circuit 56, which supplies the output signal $U_s$ of the microphone network.

Using the same concept it is also possible to obtain a network comprising an odd number of 2P+1 loudspeakers having the radiation pattern of the type shown in FIG. 9a. Said radiation (or directivity) pattern can also be obtained by means of a network comprising an even number of transducers distributed symmetrically relative to point 0.

Figure 11:
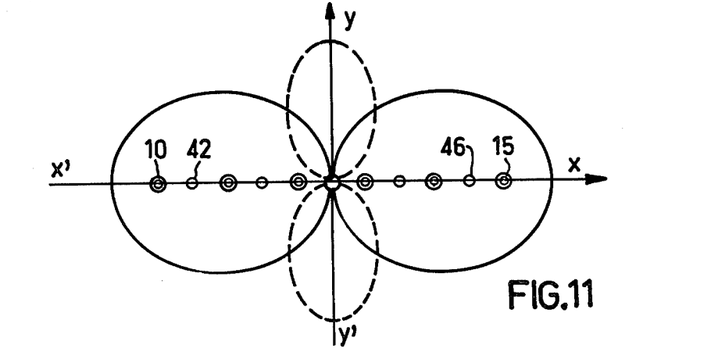
FIG. 11 shows an arrangement comprising the loudspeaker network of FIG. 5 and the microphone network of FIG. 10.

FIG. 11 shows an arrangement of two transducer networks, one of the type of FIG. 5 and the other of the type of FIG. 10. In this arrangement the two networks have their transducers disposed on the same line, suitably with coincident radiation and directivity centres. FIG. 11, in the plane (x'x, y'y) perpendicular to the axis Oz, shows the six loudspeakers 10 to 15 and the five microphones 42 to 46 arranged in-line on the line x'x' and disposed symmetrically relative to the centre 0. Since the loudspeakers and microphones correspond to electric circuits shown in FIGS. 5 and 10, the loudspeaker network has the radiation pattern of FIG. 4a in the plane (Oz, x'Ox) and the microphone network has the directivity pattern of FIG. 9a in the same plane. It is evident that this results in elimination of the coupling between the two transducer networks by surface reflection. In the plane (x'Ox, y'Oy) the radiation pattern of the loudspeaker network has the shape of the solid line in FIG. 11 and the directivity pattern of the microphone network has the shape of the dashed curve. It is easy to see that this results in the elimination of direct coupling between the two transducer networks.

In a variant of the arrangement of FIG. 11 an odd number of loudspeakers and an even number of microphones may be employed in order to obtain similar characteristics. In a further variant use can be made of an even number of loudspeakers in order to form a network of the first type and an even number of microphones in order to form a network of the second type. The distance between the two transducers nearest the point 0 should then be 2d for the network of loudspeakers and d for the microphone network.

The distance d, which defines the spacing between the transducers in each network, is suitably chosen in such a way that the ratio $d/\lambda$ is smaller than 1, $\lambda$ being the wavelength of the acoustic waves.

As already stated, the radiation and directivity patterns are distorted as a function of the frequency or wavelength $\lambda$ of the acoustic waves. In order to ensure that undesired coupling between the two transducer networks is eliminated over a wide frequency range (for example 300–3400 Hz) it is important that the patterns have the same directions of zero radiation and zero directivity over this entire range, despite their distortion. This requirement can readily be met with the transducer networks of the first type described with reference to FIGS. 5 and 6, which have radiation or directivity patterns corresponding to a high-pass filter. However, with the transducer networks of the second type of FIG. 10, which have a radiation or directivity pattern corresponding to a low-pass filter, the radiation or directivity will be strictly zero for only one frequency of the acoustic waves. In order to maintain acoustic decoupling over a wide frequency range, this implies that an arrangement of a pair of transducer networks as shown in FIGS. 7 or 8 is more advantageous than that of FIG. 11.

Figure 8:
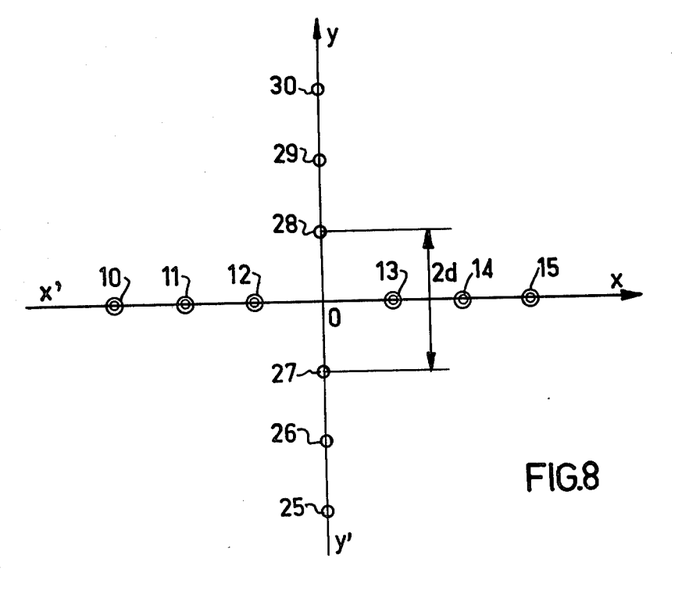

The arrangements of transducer networks of FIGS. 7, 8 and 11 are special embodiments of the invention. In general, in order to improve the spatial radiation and directivity distribution and to improve the decoupling between the two transducer networks, it may be useful to arrange said transducers in a different way in a plane or in a three-dimensional space. For example, a plurality of pairs of transducer networks, each in accordance with the pairs of networks of FIGS. 7, 8 or 11, may be arranged in one plane, said pairs of networks suitably having the same centre 0. In particular, two pairs of networks each in accordance with FIG. 11 may be arranged on two lines which are suitably perpendicular to each other.

The analogy between the transfer function of a filter and the radiation or directivity patterns indicates that, in the same way as it is possible to modify the transfer function $|H(f)|$ by the number and value of the coefficients of the digital filter, it is possible to modify the radiation and directivity patterns so as to obtain the desired decoupling by changing the number of loudspeakers and microphones and the values of the weighting coefficients of the signals applied to (or supplied by) said transducers. Specifically, by means of the formula $f=(\sin \alpha/(\lambda)$ the cutoff frequency $f_c$ and the pass band $\Delta f$ of a high-pass or low-pass filter can be made to correspond to a "cut-off angle" $\alpha_c$ and a "pass sector" $\Delta \alpha$ for the radiation and directivity patterns. In the same way that the pass band $\Delta f$ of a filter is reduced by increasing its number of coefficients, the pass sector $\Delta \alpha$ is reduced by increasing the number of loudspeakers and microphones in the two networks, which will improve the decoupling between the two transducer networks.

However, in many cases it is not necessary that the network comprises a very large number of transducers in order to obtain a satisfactory decoupling, if use can be made of the favourable shape of the patterns of each transducer, which so far have been assumed to be perfectly omni-directional.

It is for example possible to employ networks with two transducers, which networks are the simplest version of the networks of the first type shown in FIGS. 5 and 6. Said networks with two transducers have a radiation or directivity pattern corresponding to a high-pass filter whose transfer function is $|H(f)| = |\sin \pi fT|$. It follows that the radiation or directivity pattern should be in conformity with the expression:

$$|\rho(\alpha)| = |\sin[\pi(d/\lambda)\sin\alpha]| \quad (1)$$

In a network of this type comprising two loudspeakers, these loudspeakers are energized with signals of the same amplitude and opposite phase. In a network of this type comprising two microphones the phase of the signal supplied by one microphone is inverted and the signal with inverted phase is added to the signal supplied by the other microphone. This two-transducer network has the advantage already mentioned for the networks of the first type, namely that it has a direction, which does not vary with the wavelength λ of the acoustic waves, for which the radiation or directivity is zero.

It is also possible to employ networks having three transducers in line, which networks are a simple version of the networks of the second type shown in FIG. 10. These three-transducer networks have a radiation or a directivity pattern corresponding to a low-pass filter whose transfer function is for example of the sustained cosine type and which complies with the expression $|H(f)| = \frac{1}{2}|1 + \cos 2\pi fT|$. It follows that the radiation or directivity pattern complies with the expression:

$$|\rho(\alpha)| = \frac{1}{2}|1 + \cos[2\pi(d/\lambda)\sin\lambda]| \quad (2)$$

In a network of this type comprising three loudspeakers arranged in line, the three loudspeakers are energized with signals of the same phase, the amplitude of the signals with which the two outer loudspeakers are energized being half that of the signal driving the central loudspeaker. In a network of this type comprising three in-line microphones the signals supplied by the two extreme microphones are halved and subsequently added to the signal supplied by the centre microphone. This network of three transducers has the drawback already mentioned for the networks of the second type, namely that the direction for which the radiation or directivity pattern is zero is only well-defined for one wavelength 80 of the acoustic waves.

Figure 12:
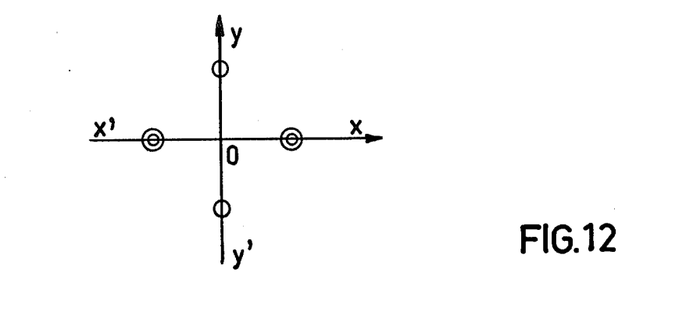
FIG. 12 shows an arrangement of two loudspeakers and two microphones disposed in one plane on two lines perpendicular to each other.
Figure 13:
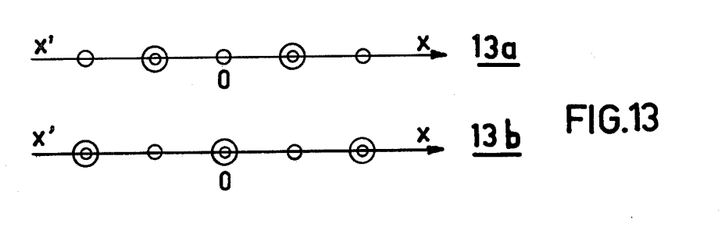
FIG. 13 shows an arrangement of two loudspeakers arranged in line with three microphones and an arrangement of three loudspeakers disposed in line with two microphones.
Figure 14:
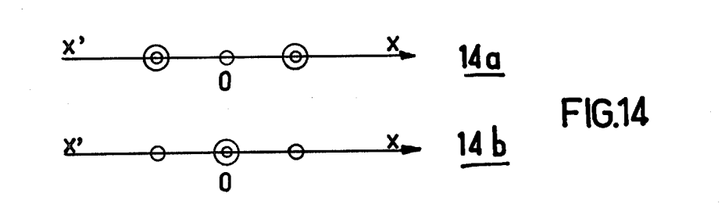
FIG. 14 shows an arrangement of two loudspeakers disposed in line with one microphone and an arrangement of two microphones disposed in line with one loudspeaker.

FIGS. 12, 13, 14 show arrangements utilizing these types of simple networks for eliminating acoustic coupling. FIG. 12 shows a network of two loudspeakers arranged on the line x'Ox and a network of two microphones disposed on the perpendicular line y'Oy. The radiation and directivity patterns in the plane xOy are of the type shown in FIG. 7 and, more specifically, comply with expression (1) given in the foregoing. This arrangement has the advantage that it provides directions of zero directivity and radiation regardless of the wavelength λ of the acoustic waves.

FIG. 13a shows a network with two loudspeakers disposed in line and a network of three microphones disposed on the line x'Ox. The radiation and directivity patterns in the plane xOy are of the type shown in FIG. 11. More specifically, the radiation diagram of the network of two loudspeakers complies with expression (1) and the directivity pattern of the network comprising three microphones, for example, satisfies expression (2) given in the foregoing. The inverse arrangement is shown in 13b, which arrangement uses a network of three loudspeakers and a network of two microphones.

FIG. 14 shows the two simplest arrangements. FIG. 14a shows one microphone in conjunction with two loudspeakers and FIG. 14b one loudspeaker in conjunction with two microphones.

The simple arrangements shown in FIGS. 12, 13, 14 may for example be used in a "loudspeaking" telephone set, if desired in conjunction with highly simplified devices for reducing the electric coupling. In order to meet the requirement (d/λ) < 1 in the frequency band 300–3400 Hz, they may for example be selected so that d = 5 cm, d being the distance between the transducers in a network.

What is claimed is:

1. An electroacoustic transducer arrangement comprising: an acoustic wave transmitter including a first network of electroacoustic transducers, an acoustic wave receiver including a second network of electroacoustic transducers, said networks being arranged relative to each other such that the transmitter network has a characteristic radiation-pattern a center of which substantially coincides with a center of a characteristic directivity pattern of the receiver network, means for controlling the phase and amplitude of the signals applied to the transducers of the transmitter network and the signals supplied to an adder circuit by transducers of the receiver network so that in the frequency band in which oscillations are likely to occur the radiation pattern of the transmitter network and the directivity pattern of the receiver network each have a minimum value of substantially zero in at least one direction, the first and second networks being arranged relative to each other so that the directions of minimum radiation and directivity substantially correspond to directions of maximum coupling between the transducers of the first and second networks, one of said transducer networks including an even number of transducers of one type arranged symmetrically on either side of a point 0 on a line x'x and with the transducers situated on each side of point 0 being spaced from each other by a distance d, and wherein said controlling means includes weighting circuits by means of which the transducer signals of at least one of said networks are weighted so that its characteristic pattern is zero in the directions of lines which pass through point 0 and perpendicular to the line x'x.

2. An arrangement as claimed in claim 1 wherein the two transducers on the line x'x nearest point 0 and on opposite sides thereof are spaced from each other by the distance d.

3. An arrangement as claimed in claim 1 wherein the other transducer network comprises an even number of transducers of the other type and disposed symmetrically relative to said point 0 on a line y'y perpendicular to said line x'x, the transducers situated at the same side of point 0 being spaced from each other by the distance d and with the transducer signals weighted by weighting circuits such that the characteristic pattern of the transducer network disposed on the line y'y is zero in the direction of lines which pass through point 0 and which are perpendicular to the line y'y.

4. An arrangement as claimed in claim 3, characterized in that the two transducers nearest point 0 on the line y'y are spaced from each other by a distance 2d.

5. An arrangement as claimed in claim 3 wherein the one network comprises two loudspeakers disposed symmetrically relative to a point 0 on a line x'x and the other network comprises two microphones disposed symmetrically relative to said point 0 on a line y'y perpendicular to the line x'x, the two loudspeakers receiving signals of the same amplitude and opposite phase and the two microphones supplying signals of equal amplitude and opposite phase to an adder circuit.

6. An arrangement as claimed in claim 3 wherein for transducers disposed symmetrically relative to point 0 on the line y'y the weighting circuits produce signals of equal amplitude and opposite phase.

7. An arrangement as claimed in claim 3 wherein the two transducers nearest point 0 on the line y'y are spaced apart by the distance d.

8. An arrangement as claimed in claim 1 wherein the two transducers of the one network nearest point 0 are disposed at the distance d from each other, characterized in that the other network comprises of transducers of the other type disposed symmetrically relative to point 0 on the line x'x formed by the one network, the transducers of said other network being spaced from each other by the distance d, and the controlling means includes weighting circuits by means of which the transducer signals of the other of said networks are weighted so that the characteristic pattern of the other network of transducers disposed on the line x'x is zero in the directions of lines passing through point 0 and perpendicular to a line y'y perpendicular to said line x'x.

9. An arrangement as claimed in claim 8, characterized in that the weighting circuits produce signals of equal amplitude and the same phase related to the transducers of the other network disposed on the line x'x and disposed symmetrically relative to point 0 on said line.

10. An arrangement as claimed in claim 1 wherein the one network comprises two loudspeakers disposed symmetrically relative to point 0 on the line x'x and the other network comrpises three microphones disposed symmetrically relative to point 0 on said line x'x, the two loudspeakers receiving signals on the same amplitude and opposite phase, and an adder circuit receiving signals of the same phase from the three microphones wherein the two outer microphones supply signals of an amplitude equal to half the amplitude of the signal supplied by the centre microphone.

11. An arrangement as claimed in claim 1 wherein the one network comprises two microphones disposed symmetrically relative to a point 0 on the line x'x and the other network comprises three loudspeakers disposed symmetrically relative to point 0 on said line x'x, the two microphones supplying signals of equal amplitude and opposite phase to an adder circuit, and the two outer loudspeakers receiving signals of an amplitude equal to half the amplitude of the signal received by the centre loudspeaker and of the same phase.

12. An arrangement as claimed in claim 1 wherein the other of said transducer networks includes transducers arranged symmetrically on either side of said point 0 and with the transducers on each side of said point 0 spaced from each other by a distance d, the distance d being selected so that the ratio (d/λ) is smaller than 1 for each of said transducer networks, λ being the wavelength of the acoustic waves.

13. An arrangement as claimed in claim 1 wherein for transducers disposed symmetrically relative to point 0 on the line x'x the weighting circuits produce signals of equal amplitude and opposite phase.

14. An arrangement as claimed in claim 1 wherein the two transducers on the line x'x nearest to and on opposite sides of point 0 are spaced apart by a distance 2d.

15. An arrangement as claimed in claim 1 wherein the two transducers of the one network nearest point 0 are spaced apart by a distance 2d and the other network comprises an odd number of transducers of the other type disposed symmetrically relative to point 0 and on the line x'x and spaced apart from each other by the distance d.

16. An arrangement as claimed in claim 1 wherein said one network comprises at least two loudspeakers and the other network includes at least two microphones, said weighting circuits being weighted so that the loudspeaker transducer signals produce a minimum characteristic radiation pattern in the direction of maximum coupling between the loudspeakers and the microphones.

17. An electroacoustic transducer arrangement comprising: an acoustic-wave transmitter including a first network of at least two omnidirectional electroacoustic transducers arranged on a line x'x and symmetrically about a point 0 on said line, an acoustic-wave receiver including a second network of at least two omnidirectional electroacoustic transducers arranged in a line dnd symmetrically disposed relative to said point 0, means for controlling the phase and amplitude of the signals applied to the transducers of the transmitter network and the signals supplied to an adder circuit by transducers of the receiver network so that the radiation pattern of the transmitter network and the directivity pattern of the receiver network each have a minimum value of substantially zero in at least one direction, the first and second networks being arranged relative to each other so that the directions of minimum radiation and directivity substantially correspond to directions of maximum coupling between the transducers of the first and second networks and a center of the transmitter network radiation pattern substantially coincides with a center of the receiver network directivity pattern.

18. An arrangement as claimed in claim 17 wherein the transducers of the second network are arranged on a line y'y perpendicular to the line x'x and passing through said point 0.

19. An arrangement as claimed in claim 18 wherein the transducers of each network located on one side of point 0 are spaced apart by a distance d, and wherein the two transducers of one network that are closest to point 0 are spaced apart by a distance 2d.

20. An arrangement as claimed in claim 18 wherein adjacent pairs of transducers of the first network are equally spaced and adjacent pairs of transducers of the second network are equally spaced.

21. An arrangement as claimed in claim 18 wherein said controlling means includes weighting circuits weighted so that the first network transducer signals produce a minimum radiation characteristic pattern along the line y'y and the second network of transducers exhibits a minimum directivity characteristic pattern along the line x'x.

22. An arrangement as claimed in 17 wherein the transducers of the second network are arranged on the line x'x alternating with the transducers of the first network, and wherein the transducers of the first network are spaced apart by a distance d and the transducers of the second network are spaced apart by a distance d.

23. An arrangement as claimed in 22 wherein one of said transducer networks comprises an even number of electroacoustic transducers and the other transducer network comprises an odd number of electroacoustic transducers.

24. An arrangement as claimed in 17 wherein the transducers of at least one network are spaced apart by a distance d which is chosen so that $d/\lambda$ is less than one, wherein $\lambda$ is the wavelength of the acoustic wave.

25. An arrangement as claimed in 24 wherein the transducers of the first network comprise loudspeakers, and said controlling means applies signals of equal amplitude and opposite phase to the two loudspeakers closest to and on opposite sides of the point 0, and wherein at least one other pair of loudspeakers symmetrically disposed on opposite sides of the point 0 are supplied with signals of opposite phase and of equal amplitudes but different from the signal amplitudes applied to said two loudspeakers closest to the point 0.

26. An arrangement as claimed in claim 17 wherein the transducers of the second network are arranged on the line x'x alternating with the transducers of the first network and with adjacent pairs of transducers of the first network being equally spaced and adjacent pairs of transducers of the second network being equally spaced.

27. An arrangement as claimed in claim 17 wherein the transducers of the second network are arranged on the line x'x alternating with the transducers of the first network, and wherein said controlling means includes weighting circuits weighted so that the first network transducer signals produce a minimum radiation characteristic pattern along a line y'y passing through said point 0 and perpendicular to the line x'x.

* * * * *